United States Patent [19]
Kleinherenbrink et al.

[11] Patent Number: 5,939,128
[45] Date of Patent: Aug. 17, 1999

[54] PREPARATION OF HEAT-TREATED MESOMORPHIC PHASES IN FOOD PRODUCTS

[75] Inventors: Franciscus Antonius Kleinherenbrink, Schiedam; Willibrord Cornelis Van Der Meijs, Vlaardingen; Rob Sikking, Gouda; Isaäc Heertje, Alphen, all of Netherlands

[73] Assignee: Van den Bergh Foods Co., division of Conopco, Inc., Lisle, Ill.

[21] Appl. No.: 08/892,332

[22] Filed: Jul. 14, 1997

Related U.S. Application Data

[63] Continuation of application No. 08/472,824, Jun. 7, 1995, abandoned.

[30] Foreign Application Priority Data

Jun. 20, 1994 [EP] European Pat. Off. .............. 94201760

[51] Int. Cl.$^6$ ..................................................... A23L 1/035
[52] U.S. Cl. .......................... 426/602; 426/601; 426/611; 426/804; 426/604; 252/302; 252/351; 252/358
[58] Field of Search .................................... 426/601, 804, 426/611, 604, 602; 252/302, 351, 358

[56] References Cited

U.S. PATENT DOCUMENTS

| | | | |
|---|---|---|---|
| 4,770,892 | 9/1988 | Grealy et al. . | |
| 4,788,075 | 11/1988 | Joseph et al. . | |
| 4,873,094 | 10/1989 | Pischke et al. . | |
| 5,082,684 | 1/1992 | Fung | 426/566 |
| 5,106,644 | 4/1992 | El-Nokaly . | |
| 5,308,639 | 5/1994 | Fung | 426/602 |
| 5,620,734 | 4/1997 | Wesdorp | 426/601 |
| 5,652,011 | 7/1997 | Heertje | 426/804 |

FOREIGN PATENT DOCUMENTS

| | | |
|---|---|---|
| 1180250 | 1/1985 | Canada . |
| 315 472 | 10/1989 | European Pat. Off. . |
| 91/18514 | 12/1991 | WIPO . |
| 92/09209 | 6/1992 | WIPO . |
| 94/14338 | 7/1994 | WIPO . |

OTHER PUBLICATIONS

"Industrial Gums," Whistler ed. (Academic Press, 1973), pp. 643, 666 discloses that hydroxypropylcellulose is a surface active agent and methylcellulose and hydroxyproplymethylcellulose are listed as emulsifying agents.

Lutton, "Phase Behavior of Aqueous Systems of Monoglycerides," J.A.O.C.S., vol. 42, 1965 (Champaign, IL), p. 1069.

Cereal Chemistry, vol. 58, No. 3, 1981 (Minneapolis, MN), pp. 158–164, by N. Krog, "Theoretical Aspects of Surfactants in Relation to Their Use in Breadmaking".

DesRosier, Norman W., PhD, "The Technology of Food Preservation", pp. 246–249, 1959.

*Primary Examiner*—Carolyn Paden
*Attorney, Agent, or Firm*—Gerard J. McGowan, Jr.

[57] ABSTRACT

A process for the preparation of a pasteurised or sterile mesomorphic phase of surfactants, comprising the sequential steps of:

(a) preparing a premix comprising surfactants and water at a temperature above the Krafft temperature of the surfactant and below the lamellar-cubic transition temperature of the surfactant-water mixture;

(b) heating the premix at a temperature above the lamellar-cubic transition temperature of the surfactant-water mixture;

(c) holding the premix between the Krafft temperature of the surfactant and the lamellar-cubic transition temperature of the surfactant-water mixture, especially with applying high shear, for a sufficient time to allow the mixture to reach a continuous lamellar phase; and (d) cooling the premix to below the Krafft temperature of the surfactants.

As an alternative to the shear treatment, the premix can be held at a temperature below the Krafft temperature of the surfactant for at least 0.1 second between steps (b) and (c).

The mesomorphic phase thus obtained process can be mixed with further food ingredients to produce a low-fat food product.

12 Claims, No Drawings

PREPARATION OF HEAT-TREATED MESOMORPHIC PHASES IN FOOD PRODUCTS

This is a continuation application of Ser. No. 08/472,824, filed Jun. 7, 1995 now abandoned.

BACKGROUND OF THE INVENTION

The present invention relates to a process for the preparation of heat-treated mesomorphic phases, to novel heat-treated mesomorphic phases and to products containing such heat-treated mesomorphic phases.

It is known from WO 92/09209 to incorporate mesomorphic phases of edible surfactants in food products, for example as a fat-replacer, structuring agent and whipping agent. The cited patent application also describes the production of a pasteurised zero-fat spread by preparing a mesomorphic phase at 65° C., pasteurising the mixture at 80° C. for 45 seconds, cooling the mixture to 65° C. and further processing and packing the product.

However, pasteurisation of a mesomorphic phase according to the prior art processes does not generally lead to a continuous lamellar, swollen structure, which is often desired in such low-fat products. Furthermore, it is sometimes desirable to have a sterilised product rather, because although pasteurised products are substantially free from microorganisms, they often still contain spores and therefore either need a preservative or a low pH, in order to become stable for a prolonged period. Sterilisation of mesomorphic phases using the conventional techniques does not result in a continuous, swollen structure.

SUMMARY OF THE INVENTION

It is an object of the invention to provide a heat-treated mesomorphic phase and a food product containing it, wherein the mesomorphic phase is a lamellar phase, i.e. having a bilayer structure of surfactant and water, which is at least partly swollen and continuous. It has been found that this can be achieved if the mesomorphic phase is prepared in a special process.

Accordingly the present invention relates to a process for the preparation of a heat-treated mesomorphic phase of surfactants, comprising the sequential steps of:

(a) preparing a premix comprising surfactants and water at a temperature above the Krafft temperature of the surfactant and below the lamellar-cubic transition temperature of the surfactant-water mixture;

(b) heating the premix at a temperature above the lamellar-cubic transition temperature of the surfactant-water mixture;

(c) holding the premix between the Krafft temperature of the surfactant and the lamellar-cubic transition temperature of the surfactant-water mixture under appropriate conditions and/or for a sufficient time to allow the mixture to reach a continuous lamellar phase; and (d) cooling the premix to below the Krafft temperature of the surfactants.

DETAILED DESCRIPTION OF THE INVENTION

Mesomorphic phases and their method of preparation are known to food scientists. In the "Lipid Handbook" of Gunstone, Harwood and Padley (Chapman and Hall, 1986) such phases are mentioned at page 227. Further detail may be found in "Food emulsions" of S. Friberg (Marcel Decker, 1976 at page 82).

Mesomorphic phases are semi-ordered phases of water and edible surfactant materials. Examples of mesomorphic phases are cubic, hexagonal, alpha-crystalline gel, beta-crystalline coagel and lamellar phases. The mesomorphic phases for use in accordance with the invention are lyotropic phases, in particular lamellar phases. For the purpose of the present invention, the term lamellar phase refers to any system having a pattern of alternating bilayers of edible surfactants and water. Examples of lamellar phases are lamellar droplet phases, lamellar gel phases and lamellar phases containing extended parallel layers of surfactants and water. The invention is not primarily concerned with mesomorphic structures which act as carrier materials e.g. for fats or flavouring. A continuous lamellar phase is understood to be a one-phase system wherein essentially all water is present in the (lamellar) mesomorphic phase. Minor deviations from continuity are still regarded as being continuous for the purpose of the invention.

In the lamellar phase, surfactants are believed to form a bilayer structure. It is believed that a bulk lamellar phase consists of stacks of bilayer structures with an intervening aqueous phase. Under appropriate conditions, the intervening aqueous phase may expand to produce a swollen structure which is substantially continuous, containing as much as 80% or more of water.

The so-called 'Krafft' temperature of a particular surfactant/water mixture is the temperature at which water penetrates the adjacent 'head' groups of the surfactant molecules to form a lyotropic phase, i.e. a liquid crystal structure. On cooling below the Krafft temperature, the hydrophobic chains pack into a regular lattice, producing a one-dimensionally periodic structure of alternating surfactant and water layers.

For the purpose of the invention, the 'lamellar-cubic transition temperature' of a particular surfactant/water mixture is the temperature at which, on heating, destruction of the lamellar phase starts and a cubic phase is formed. The lamellar-cubic transition temperature of a mixture of water and mono-($C_{16}$–$C_{18}$) glycerides is e.g. about 75° C. and, above a water content of about 50%, it is largely independent on the water content.

Although applicants do not wish to be bound by any theory, it is believed that the following occurs in steps (a) to (c) as indicated above.

During step (a) it is believed that a structuring of the surfactants occurs, resulting in the formation of a mesomorphic system, presumably as a lamellar phase. If the premix is heat-treated in step (b) after the formation of these "liquid" mesomorphic structures, then the lamellar phase is turned into a cubic phase. The temperature treatment in step (c) then results in the re-formation of the desired lamellar mesomorphic structure, provided that the temperature is held for a sufficient time or using appropriate conditions.

Step (a) involves the preparation of a premix comprising one or more surfactants and water at a temperature above the Krafft point of the surfactants. The Krafft point of the surfactants will generally vary in a broad range. If the Krafft point is above ambient temperature, then step (a) will involve a heating step. Either the ingredients will be premixed and then heated, or the surfactants are added to heated water. For example, if saturated monoglycerides are used as surfactants, preferably step (a) involves the heating to a temperature of 30–75° C., more preferably 50–70° C. The time of keeping the premix at a temperature above the Krafft point is preferably at least 5 seconds, more preferably 1 to 200 minutes, especially up to 100 minutes.

If more than one surfactant is used for the preparation of the premix, these surfactants can be added separately. Suitable surfactants that can be used in combination are listed below. When desired, the surfactants can also be added as a blend. In that case the surfactants are preferably melted and mixed above their melting point. After mixing, the blend is then solidified below the melting point of the surfactants and ground to a powder. The application of such a blend can be advantageous in that it can reduce the total mixing time needed for the preparation of the premix at a temperature above the Krafft point of the surfactants.

When desired, other ingredients may be added to the premix. If this occurs between step (a) and (b), (partial) cooling, for example below the Krafft point, may be desired.

Suitable heat treatment times and temperatures in step (b) result in pasteurised or sterilised products. If pasteurisation is performed, this results in a product in which all microorganisms, except spores and some enzymes, are killed. The conditions for pasteurisation can vary with heating temperature and heating time. Heating can be carried out to a temperature between 63° C. and 110° C. for 10 seconds to 30 minutes, especially to a temperature between 68° C. and 110° C. and particularly for 10 seconds until 2 minutes, depending on the nature and the amounts of the ingredients of the premix. If, for example, the premix contains only water and surfactant, pasteurisation may be achieved by using a temperature of 80° C. for about 30 seconds. This represents a preferred minimum treatment in step (b). More preferably, pasteurisation in step (b) involves a temperature of at least 85° C. for at least 30 seconds or even 1 minute or longer. The heat treatment of step (b) is generally performed under such conditions of time and temperature, that the lamellar phase formed during step (a) is at least partly destroyed.

If sterilisation is performed in step (b), this results in a product having a *Clostridium botulinum* spore reduction of at least $10^{-12}$ as compared to the non-sterilised product. Preferably the sterilising conditions render the mesomorphic phase substantially free from *Clostridium botulinum* spores. Preferably step (b) involves the heating to a temperature of at least 110° C., more preferably 120–155° C., most preferably 130–150° C. The time of heating will generally be from 0.1 second to 100 minutes, depending on the temperature of heat treatment. For example the heating time will generally be from 1–30 minutes for sterilisation at 120° C.; and from 0.1 to 180 seconds for sterilisation at 150° C. Heating to temperatures of 130–150° C., say around 140° C., for e.g. 1 to 25 seconds, results in a good balance between spore reduction (rapid increase with temperature), costs of heating (increase with an increase of temperature), time of heating (decrease with an increase of temperature) the development of off-flavours, side-reactions etc. (increase with an increase of temperature and time).

Step (c) involves cooling the mesomorphic phase and holding the temperature below the lamellar-cubic transition temperature, but above Krafft temperature. If this temperature is used after only cooling of the mesomorphic phase, it should be maintained for a substantial period, depending on the surfactant system used; for a monoglyceride surfactant this will be at least 1 minute, particularly at least 3 minutes; for other systems it may be shorter.

It was found that the time during which in step (c) the premix should be kept at a temperature above the Krafft temperature of the surfactant and below the lamellar-cubic transition temperature of the surfactant-water mixture in order to allow the mixture to reach a lamellar phase can be drastically reduced by applying a high-shear treatment to the product. Methods and means for applying high shear forces are known to the skilled person. The shear treatment can be performed both in batch processes and, sometimes preferably, in continuous processes. Suitable equipment for effecting shear treatment include a homogeniser, multiple pin stirrer, static mixer, "high-shear" mixer, colloid mill, Ultra-Turrax ®, centrifugal pump and the like. The time necessary for the mixture to reach the lamellar phase depends on the particular shear conditions and equipment, and may be shorter than a second or a few seconds.

It was found furthermore that the time necessary to allow the mixture to reach a continuous lamellar phase in step (c) can also be drastically reduced if, after step (b) and prior to step (c), the premix is cooled to a temperature below the Krafft temperature, and is then reheated. The temperature may be as little as 1° C. or even 0.1° C. below the Krafft temperature for as little as 0.1 sec in order to obtain a substantial reduction in the holding time of step (c). Preferably, the premix is held at the temperature below the Krafft for at least 1 sec, up to e.g. 1 minute. The temperature above the Krafft temperature and below the lamellar-cubic transition temperature in step (c) may then advantageously maintained for 10 seconds to 60 minutes or even longer.

After step (c) the premix is cooled below the Krafft temperature in step (d). Generally this cooling will be to an ambient temperature or lower, for example refrigerator temperatures (5° C.). Preferably cooling is done in a short period e.g. ambient or refrigerator temperature are preferably reached within 5 minutes after step (c) in particular within 10 seconds to 2 minutes.

Before, during or after step (c), the product is usually aseptically filled into a suitable package for further use. However, it is preferred that the product is subjected to continuous (as opposed to batch) heat-treatment, i.e. heat-treatment before packaging. On the other hand, the product can be subjected to further processing after step (c).

Food products of the invention are preferably packed into single use packs, i.e. packs which contain an amount of product which is to be used at the same time, for example portion packs. Other suitable packs may be multiple use packages e.g. containing 1 to 10,000 g of product. For maintaining the sterilised or pasteurised nature of the product, that package should preferably be closed e.g. sealed. Equally, before, during or after step (c), the product may be mixed with further ingredients, e.g. to form a food product or other product. Preferably these ingredients are mixed either before heat treatment or after heat treatment under sterile or aseptic conditions. This ensures the pasteurised or sterile nature of the final aseptically filled product.

The invention is also concerned with heat-treated continuous, swollen mesomorphic phases obtainable by the process described above. Heat-treated in this context means that the mesomorphic phase has been subjected to a temperature and for a period which are sufficient to kill all micro-organisms; alternatively they are pasteurised or sterilised according to the definitions given above.

Sterilised or pasteurised mesomorphic phases as described above may suitably be used in various products, for example skin creams, other personal products etc. Most preferably however, the sterilised or pasteurised mesomorphic phases are used in food products. For this purpose the mesomorphic phases are made of edible surfactants. Suitable food products are for example spreads, dressings, cheese, sauces, meat products, whippable products such as bavarois, non-dairy cream and mousses and dough products for example batters, pizza doughs and bread doughs. Especially preferred is the use of heat-treated mesomorphic phases of edible surfactants in ambient stable food products which preferably have pH of at least 4.6. Most preferred is the use of these mesomorphic phases in food products which are free of preservatives. These products could previously not be made. Another preferred embodiment involves the use of heat-treated mesomorphic phases in whippable products, i.e. products which after whipping in standard whipping equipment have a specific volume of more than 1.25 litre per kg.

The presence of mesomorphic phases e.g. in food products may be detected by any method suitable for the detection of regular arrangements of surfactant materials. Suitable methods include for example NMR, electron microscopy, differential scanning calorimetry, light microscopy and X-ray diffraction.

The heat-treated mesomorphic phase according to the invention is a swollen lamellar phase, for example an alpha-gel phase. These phases are particularly preferred, because they can include a large amount of water, e.g. 98 or even 99 wt. %, based on the product. Especially preferred are products which contain a stable lamellar structure, i.e. an alpha-gel structure that during storage for two weeks at ambient temperature or lower does not significantly (less than 50% conversion) convert to non-lamellar structures.

Another preferred element of the present invention is the presence of bulk regions of mesomorphic lamellar phases in food products. Bulk phases preferably consist of either a more or less continuous mesomorphic phase or of discrete particles of mesomorphic phase, for example having a number average particle size of between 1 $\mu$m and 10,000 $\mu$m, more preferred more than 5 $\mu$m, e.g. 15 to 1500 $\mu$m. A continuous phase is preferred.

Preferably food products in accordance with the invention contain at least 1% by weight of heat-treated mesomorphic phase of edible surfactant, more preferred 3–100 wt. %, for example 10–90 wt. %.

According to the present invention any surfactant may be used, although lipidic substances are preferred. However, the use of other, non-lipidic surfactants, for example carbohydrates, is not excluded. For food products, any edible surfactant may be used. In general the preferred edible surfactants are selected from nonionic surfactants, anionic surfactants and cationic surfactants.

Preferred non-ionic or zwitterionic surfactants are edible monoglycerides, diglycerides, poly-glycerol esters, non-ionic phospholipids e.g. phosphatidylcholine, non-fatty carboxylic acid esters of fatty acid esters, partial sugar-fatty acid esters and, partial fatty acid esters of polyols, alkali metal salts of fatty acids and mixtures thereof.

Preferred cationic surfactants are cationic non-fatty carboxylic acid esters of fatty acid esters and mixtures thereof.

Preferred anionic surfactants are lactylated fatty acid salts, anionic phospholipids, anionic non-fatty carboxylic acid esters of fatty acid esters and their metal salts, fatty acids and their metal salts and mixtures thereof. Some commercial surfactants, such as monoglycerides, already contain appreciably amounts of free fatty acids: in those cases it may not be necessary to add an ionic cosurfactant, if the product has a neutral or near-neutral Ph.

The fatty acid chains used in these surfactants can be of any type and origin. Preferably, however $C_{8-28}$ fatty acid chains are present, more preferred $C_{12-22}$, for example $C_{14-18}$. The fatty acids may for example be saturated, unsaturated, fractionated or hydrogenated and be derived from natural (for example dairy, vegetable or animal) source or synthetic sources.

Preferred surfactants for use in products of the invention comprise as part or all of the surfactants a material of the group monoglycerides, lecithin (or other phospholipids) and lactylated fatty acid salts.

While foodstuffs according to the present invention can comprise a mesomorphic phase comprising 99–5 wt. % of water, it is preferred that the mesomorphic phase comprises 98–60 wt. % and in particular 97–80 wt. % of water, the percentages being based on the total weight of the mesomorphic phase. The total water level of products of the invention may for example be up to 99%, for example 10–90%, conveniently 20–80%. The balance of the mesomorphic phase may be the above defined surfactants e.g. at a level of at least 0.5 wt. % up to say 30 wt. % on mesomorphic phase, more preferred 1–20 wt. %, most preferred 2–12 wt. %.

Preferably the total level of edible surfactants in food products of the invention is from 0.1 to 20%, more preferably 0.2–10%, most preferably 0.5–5% by weight of the foodstuff.

Typical embodiments of the invention are illustrated hereafter by compositions which comprise, as the heat-treated mesomorphic phase, a major amount of a non-ionic surfactant. If biopolymers are present, these may become part of the mesomorphic structure.

Preferably, the mesomorphic phase comprises 1–30%, more preferably 2–10 wt. % of non-ionic surfactants such as monoglycerides, and optionally e.g. 0.01–1 wt. % of ionic co-surfactant, for example an alkali metal salt of a lactylated fatty acid, preferably sodium stearoyl lactylate, the percentages being based on the total weight of the mesomorphic phase.

The classification "non-ionic", "cationic" and "anionic" for the surfactants is of course dependent on the pH value of the foodstuff in which the surfactants are used.

Preferably the nonionic surfactant and the ionic surfactant, if the latter is used, are present in weight ratios of from 100:1 to 1:10, for example 50:1 to 1:1.

Preferred non-ionic surfactants are monoglycerides, alkali metal salts of fatty acids, lactylated esters of monoglycerides and phospholipids. Preferred ionic co-surfactants are alkali metal salts of lactylated fatty acids, e.g. sodium stearoyl lactylate (SSL), citric acid esters, ionic phospholipids (phosphatidic acid (PA), succinate esters, diacetyl tartaric acid ester of monoglyceride (DATEM).

While foodstuffs according to the invention generally will comprise 0 to 80% by weight of fat, the preferred level of this ingredient is 0–79 wt. % fat, for example 0 to 40%.

As indicated above a preferred function of the heat-treated mesomorphic phase is as a fat-replacer for part or all of the fat normally present in the food product. Preferably the food-product has a caloric content which is at least 30% less than the comparable full-fat product, also preferred are products wherein the fat level is less than 50% of the full fat product.

It has also been found that the mesomorphic phase, which is used according to the invention, can be used in foodstuffs containing relatively high levels of electrolyte, without affecting the structuring capability of the system. One example of electrolytes that may be incorporated is sodium chloride. The amount of electrolytes such as salt in foodstuffs according to the invention preferably ranges from about 0.01–5 wt. %, more preferred 0.1 to 5%, for example 0.2 to 3% based on the total weight of the food product.

The present invention comprises the use of biopolymers. These biopolymers may be added to the system in step (a) as indicated above. Addition of these materials in step (a) may lead to the incorporation of part of the biopolymer material into the "liquid" mesomorphic phase, which after heat treatment leads to a mesomorphic phase which is particularly stable during storage. Suitable biopolymers include carbohydrates e.g. gums such as guar, LBG and xanthan, starches and carrageenan, or proteins e.g. milk protein, gelatin, soy protein. Preference is given to milk protein as part or all of the biopolymers. Suitable sources for this protein are for example skimmed milk, skimmed milk powder, butter milk powder, whey powder, whey, egg protein and sodium caseinate. Preferably the level of biopolymer materials is from 0.1 to 60 wt. % of the product.

For preparing food-products containing the heat-treated mesomorphic phase in accordance with the invention, it is possible to prepare the heat-treated mesomorphic phase separately and add this phase as an ingredient to the other ingredients of the product, or it is possible to add one or more other ingredients of the composition to the premix under (a). Preferably however, the ingredients are added such that the final food product is sterilised or pasteurised. This can be achieved by adding the ingredients prior to heat-treatment or by adding sterile or pasteurised ingredients.

The invention will be further illustrated by means of specific embodiments. It will be evident that the scope of the invention is not limited to these specific embodiments.

A first embodiment of the invention relates to dressings or mayonnaise. Generally dressings or mayonnaise are oil in water emulsions. The oil phase of the emulsion generally is 0 to 80% by weight of the product. For non-fat-reduced products the level of triglycerides is generally from 60–80%, more preferred from 65–75% by weight. For salad dressings the level of fat is generally from 10–60%, more preferred from 15 to 40%. Low or no-fat content dressings may for example contain triglyceride levels of 0, 5, 10 or 15% by weight. Other fatty materials, for example polyol fatty acids esters, may be used as a replacement for part or all of the triglyceride materials.

In addition to the above mentioned ingredients, dressings in accordance with the present invention optionally may contain one or more of other ingredients which may suitably be incorporated into dressings and/or mayonnaise. Examples of these materials are emulsifiers, for example egg-yolk or derivatives thereof, stabilisers, acidifiers, bulking agents, flavours, colouring agents etc. The balance or the composition is water, which could advantageously be incorporated at levels of from 0.1–99.9%, more preferred 20–99%, most preferred 50 to 98% by weight.

The heat-treated mesomorphic phase of edible surfactant in the mayonnaise of dressing may either be prepared separately before adding the other ingredients of the composition, or may be formed in the presence of other ingredients.

Another embodiment of the invention is the use of heat-treated mesomorphic phases of edible surfactants, as generally specified in the above, in spreads.

Spreads according to this embodiment generally contain from 0–80% by weight of edible triglyceride materials. Suitable edible triglyceride materials are for example disclosed in Bailey's Industrial Oil and Fat Products, 1979. In spreads of non-reduced fat content (margarines), the level of triglyceride material will generally be from 60–80%, preferably from 70 to 79% by weight. In spreads of reduced fat content the level of triglycerides will generally be 30–60%, more general from 35 to 45% by weight. In very-low-fat spreads the level of triglycerides will generally be 0–40%, for example 30%, 25%, 20% or even 10% or about 0%. Other fatty materials, for example sucrose fatty acid polyesters, may be used as a replacement for part or all of the triglyceride material.

The edible surfactant material for use in spreads is preferably used at a level of 0.1 to 15%, more preferably 1–10%, most preferably from 2 to 8% by weight. Preferably the level of non-ionic edible surfactant is from 0.1 to 15%, more preferably 1–8%, in particular 2 to 6% by weight. Especially preferred are monoglycerides and lecithin as nonionic edible surfactants. Preferably the level of ionic edible surfactant is from 0 to 2%.

In addition to the above mentioned ingredients, spreads in accordance with the invention may optionally contain further ingredients suitable for use in spreads. Examples of these materials are gelling agents, sugar, EDTA, spices, salt, bulking agents, flavouring materials, colouring materials, proteins, acids etc. The balance of the composition is generally water, which may be incorporated at levels of up to 99.9% by weight, more general from 10 to 98%, preferably from 20 to 97% by weight.

Spreads according to the invention may be fat and/or water continuous. The heat-treated mesomorphic phase can be used as a partial or entire replacement for the water phase and/or oil phase in the spread products.

In the preparation of spreads in accordance with the invention, the mesomorphic phase may be prepared before the addition of other ingredients, or the mesomorphic phase may be prepared while other ingredients of the composition are present.

Another embodiment of the invention is the use of heat-treated mesomorphic phases of edible surfactants in whippable products, in particular whippable non-dairy creams, mousses, bavarois, etc.

Preferably the level of edible surfactant in whippable products is from 0.1 to 15% by weight, more preferably 0.5 to 5% by weight of the composition. Preferably the edible surfactant material comprises monoglycerides, for example at levels of 1 to 10%, more preferred 2 to 5% by weight. In addition to the monoglyceride, a co-surfactant may be present, for example at a level of 0 to 8%.

In addition to the edible surfactant materials in the mesomorphic phase, whippable products in accordance with the invention may advantageously contain one or more other ingredients, for example sugar, emulsifiers, colorants, flavouring agents, fat (preferably vegetable fat), skimmed milk ingredients etc. For example the fat level may be from 0 to 80%, more preferred 0–40%, for example about 5%, 15% or 30%. The balance of the composition is preferably water.

As described above the heat-treated mesomorphic phase of edible surfactants may be prepared before mixing the other ingredients or may be formed in the presence of one or more other ingredients of the composition.

Another preferred embodiment of the invention concerns the use of heat-treated mesomorphic phases of edible surfactants in cheese products, for example processed cheese or semi-hard cheese. Preferred uses for the heat-treated mesomorphic phase in cheese products are in fresh cheese and processed cheese.

Cheese products in general often contain dispersed droplets of fat dispersed in a matrix, which is often structured by casein. For the purpose of the present invention the heat-treated mesomorphic phase may be used for replacing part or all of the dispersed phase, but also possible is that the mesomorphic phase is used as a replacement for all or part of the cheese matrix. In the former case, the mesomorphic phase will be present as a bulk phase consisting of discrete particles of the mesomorphic phase. In the latter case the mesomorphic phase may be a continuous bulk phase or may consist of discrete particles.

Preferably the level of edible surfactant in the cheese product will be from 0.1 to 15% by weight of the composition, more preferred 0.5 to 10%, most preferred 1 to 8%. Preferably the level of nonionic surfactant is from 0.1 to 8%, more preferred 0.5 to 5%. The level of ionic surfactants is preferably from 0 to 7%, more preferred 0.1 to 5%. Preferably the level of biopolymer materials is from 0.1 to 60 wt. %. A preferred biopolymer material is protein, especially milk protein.

In addition to the mesomorphic phase of edible surfactant, cheese products of the invention may advantageously contain all types of ingredients which can be present in cheese, products. Examples of these ingredients are fat (preferably present at levels from 0–45%, more preferably 1–30%; other fatty materials such as for example polyol fatty acid esters can replace all or part of the fat), electrolytes (for example CaCl$_2$ and/or NaCl at levels of 0 to 5%, more preferably 1–4%), rennet or rennin (for example at a level of 0.005 to 2%, more preferred 0.01–0.5%), flavours, colouring agents, emulsifiers, stabilisers, preservatives, pH adjusting agents etc. The balance of the product is generally water which may be present at levels of for example 0–99.5%, more preferred 5–80%, more preferred 30–75% by weight).

The cheese products of the invention may be prepared by any suitable process for the preparation of cheeses. As indicated above the mesomorphic phase of edible surfactants may be formed separately or may be formed in the presence of other ingredients of the cheese product. If the heat-treated mesomorphic phase is prepared separately, the phase thus formed is preferably added to the other ingredients in stage (d) as described above.

Other food products in accordance with the invention which could advantageously contain a heat-treated mesomorphic phase of edible surfactants, include other edible emulsified systems, sauces, sweet spreads, liquid and semi-liquid dairy products, meat products, bakery cream, toppings, etc. and bakery products, for example doughs.

The invention will be illustrated by means of the following examples: All percentages in the examples are by weight of the composition unless indicated otherwise.

The following ingredients were used: The surfactant named Hymono followed by a code are trade names of Quest International.

EXAMPLE 1

A sterilised mesomorphic phase of edible surfactant was made of the following ingredients:

| | |
|---|---|
| monoglycerides (Hymono 8806 ex Quest Int.) | 5.0% |
| water | 95.0% |

The water was first heated to a temperature of 60° C. The monoglycerides were then added and thoroughly mixed in using an ultra-turrax. The pH was set to a value of 7.0 using sodium hydroxide. The mixture was stirred gently at 60° C. for about 60 minutes. The product was sterilised by UHT treatment for 10 seconds at 140° C. using an indirect tubular heat exchanger. The product was cooled to 40° C. and then re-heated to 60° C. (in-line). After a holding time of 90 sec. at 60° C., the product was cooled to 40° C. and aseptically filled into containers. The products were stored at ambient temperature.

The resulting product was a firm sterile mesomorphic phase of the edible surfactants. Polarised light microscopy showed that the mesomorphic phase was a continuous lamellar phase throughout the product.

EXAMPLE 2

A sterilised mesomorphic phase of edible surfactant was made of the following ingredients:

| | |
|---|---|
| monoglycerides (Hymono 8806 ex Quest Int.) | 5.0% |
| skimmed milk powder | 6.0% |
| tap water | 89.0% |

The same processing was used as in Example 1. Skimmed milk powder was added to the water with the monoglycerides at 60° C. The resulting product was a firm sterile mesomorphic phase of the edible surfactants. Polarised light microscopy showed that the mesomorphic phase was a continuous lamellar phase throughout the product.

EXAMPLE 3

A sterilised mesomorphic phase of edible surfactants was made of the following ingredients:

| | |
|---|---|
| monoglycerides (Hymono 8806 ex Quest Int.) | 5% |
| skimmed milk powder | 6% |
| gelatin (UG 719-N ex Extraco) | 1.5% |
| sugar | 15% |
| tap water | 72.5% |

The same premix preparation and process line were used as in example 1. After sterilisation the product was cooled to 60° C. and homogenised at 175/25 bar with a residence time of 30 seconds using an Alfa Laval SH15 homogeniser. The resulting product was a firm sterile mesomorphic phase of the edible surfactants. Polarised light microscopy showed that the mesomorphic phase was a continuous lamellar phase throughout the product.

EXAMPLE 4

The same ingredients, premix preparation and process line were used as in example 3. After sterilisation the product was cooled to 40° C. and then reheated to 60° C. (in-line). After a homogenisation step of 150/25 bar with a residence time of 20 seconds the product was cooled to 40° C. and aseptically packed. The resulting product was a firm sterile mesomorphic phase of the edible surfactants. Polarised light microscopy showed that the mesomorphic phase was a continuous lamellar phase throughout the product.

EXAMPLE 5

A margarine-like spread was formed from a pasteurised mesomorphic phase and a pasteurised aqueous phase mixed in a weight ratio of 58:42.

A pasteurised mesomorphic phase of edible surfactants was made of the following ingredients:

| | |
|---|---|
| tap water | 94.20% |
| monoglycerides (Hymono 8806 ex Quest Int.) | 5.15% |
| diacetyl tartaric ester of monoglyceride (Admul DATEM ex Quest Int.) | 0.35% |
| Titanium Dioxide | 0.30% |
| cold water soluble β-carotene (ex Hoffmann-La Roche) | minor |

The product was first heated to 58° C. and gently mixed for 75 minutes. The pH of the product was determined to be 3.0. At this stage polarised light microscopy showed that the mesomorphic phase was a continuous lamellar phase throughout the product. The product was pasteurised by a heat treatment for 36 s. at 80° C. using a tubular heat exchanger. The product was cooled to 40° C. using a scraped surface heat exchanger and then reheated to 58° C. using a tubular heat exchanger. After heating to 58° C. the product was mixed in a multiple pin stirrer at 800 rpm for at least 110 s. Polarised light microscopy showed that indeed the mesomorphic phase was again a continuous lamellar phase throughout the product. The product was then mixed and cooled to 10° C. using surface scraped heat exchangers and multiple pin stirrers.

A pasteurised aqueous phase was made from the following ingredients:

| | |
|---|---|
| tap water | 87.04% |
| gelatin (acid, 250 Bloom, ex Geltec) | 4.00% |
| rice starch (Remyline AC, ex Remy) | 3.00% |
| lactose | 2.00% |
| salt | 3.68% |
| Potassium sorbate | 0.29% |
| flavour | minor |

The solution was heated to 60° C. The pH of the solution was determined to be 4.8. The solution was pasteurised by a heat treatment for 51 s. at 80° C. using a tubular heat exchanger. The solution was then cooled and mixed to 10° C. using surface scraped heat exchangers and multiple pin stirrers.

The final product was formed by combining the mesomorphic phase of surfactants with the aqueous phase in a static mixer. The final product consisted of a continuous mesomorphic phase in which gelatin/starch gelled particles were dispersed. The product was judged by an expert panel to have a very margarine-like firmness and consistency and was found to have a melting behaviour comparable to that of a 40% fat spread.

EXAMPLE 6

The same process and formulation were used as in example 5. However, in this case a previously made blend of the monoglycerides (Hymono 8806 ex Quest Int.) and diacetyl tartaric ester of monoglyceride (Admul DATEM ex Quest Int.) was used. The blend was made by melting and mixing both surfactants at 90° C. The surfactants were used in the same weight ratio as in example 5. The blend was then solidified at 20° C., ground to a powder and stored for two weeks at 20° C.

The mesomorphic phase of edible surfactants containing 5.5% of described blend was heated to 58° C. Polarised light microscopy showed that the mesomorphic phase was directly a continuous lamellar phase throughout the product. Therefore the mixing step can be omitted from the procedure resulting in a reduction of the total premix time needed.

The final product made with this blend and with the same process and formulation as described in example 5 was indistinguishable from the product obtained in example 5.

What is claimed is:

1. A process for the preparation of a heat treated mesomorphic phase of surfactants, comprising the sequential steps of:

(a) preparing a premix comprising surfactants and water at a temperature above the Krafft temperature of the surfactant and below the lamellar-cubic transition temperature of the surfactant-water mixture;

(b) heating the premix at a temperature above the lamellar-cubic transition temperature of the surfactant-water mixture;

(c) holding the premix at a temperature below the Krafft temperature of the surfactant for at least 0.1 second;

(d) then holding the premix between the Krafft temperature of the surfactant and the lamellar-cubic transition temperature of the surfactant-water mixture for a sufficient time to allow the mixture to reach a continuous lamellar phase; and (e) cooling the premix to below the Krafft temperature of the surfactants.

2. A process according to claim 1, wherein in step (c) shear is applied under conditions which are sufficient to allow the mixture to reach a continuous lamellar phase.

3. A process according to claim 1, said process also comprising (before, during or after step (d)) aseptically filling the premix into a suitable package.

4. A process according to claim 1, wherein step (b) involves heating to a temperature of 130 to 150° C. for 0.1 to 180 seconds.

5. The process according to claim 4 wherein step b involves heating to a temperature of 130–150° C. for 1–25 seconds.

6. A process according to claim 1, wherein said premix comprises at least two surfactants and water, wherein the surfactants are consecutively (i) melted and mixed above their melting points, (ii) cooled to below their melting points and solidified, (iii) divided into solid particles, and (iv) dissolved in water.

7. A process according to claim 1, wherein the surfactants are edible surfactants.

8. A process according to claim 1, wherein the surfactants comprise a mixture of nonionic and ionic surfactants in a weight ratio of 100:1 to 1:10.

9. A process for the preparation of a food product, wherein the heat-treated mesomorphic phase as obtained by the process according to claim 1, is aseptically mixed with other ingredients of the food product.

10. A process for the preparation of a food product, wherein in the process according to claim 1, the premix under (a) contains other ingredients of the food product.

11. The process according to claim 1 wherein the heat treated mesomorphic phase resulting after step (d) contains at least 80 wt. % of water.

12. The process according to claim 11 wherein said heat treated mesomorphic phase is continuous.

* * * * *